Dec. 19, 1961  N. E. McFADDEN  3,013,361
MARBLE HOPPER AND FEED MECHANISM
Filed Oct. 16, 1957  3 Sheets-Sheet 1

INVENTOR.
Norman E. McFadden
BY
Nobbe & Swope
ATTORNEYS

Dec. 19, 1961    N. E. McFADDEN    3,013,361
MARBLE HOPPER AND FEED MECHANISM
Filed Oct. 16, 1957    3 Sheets-Sheet 2
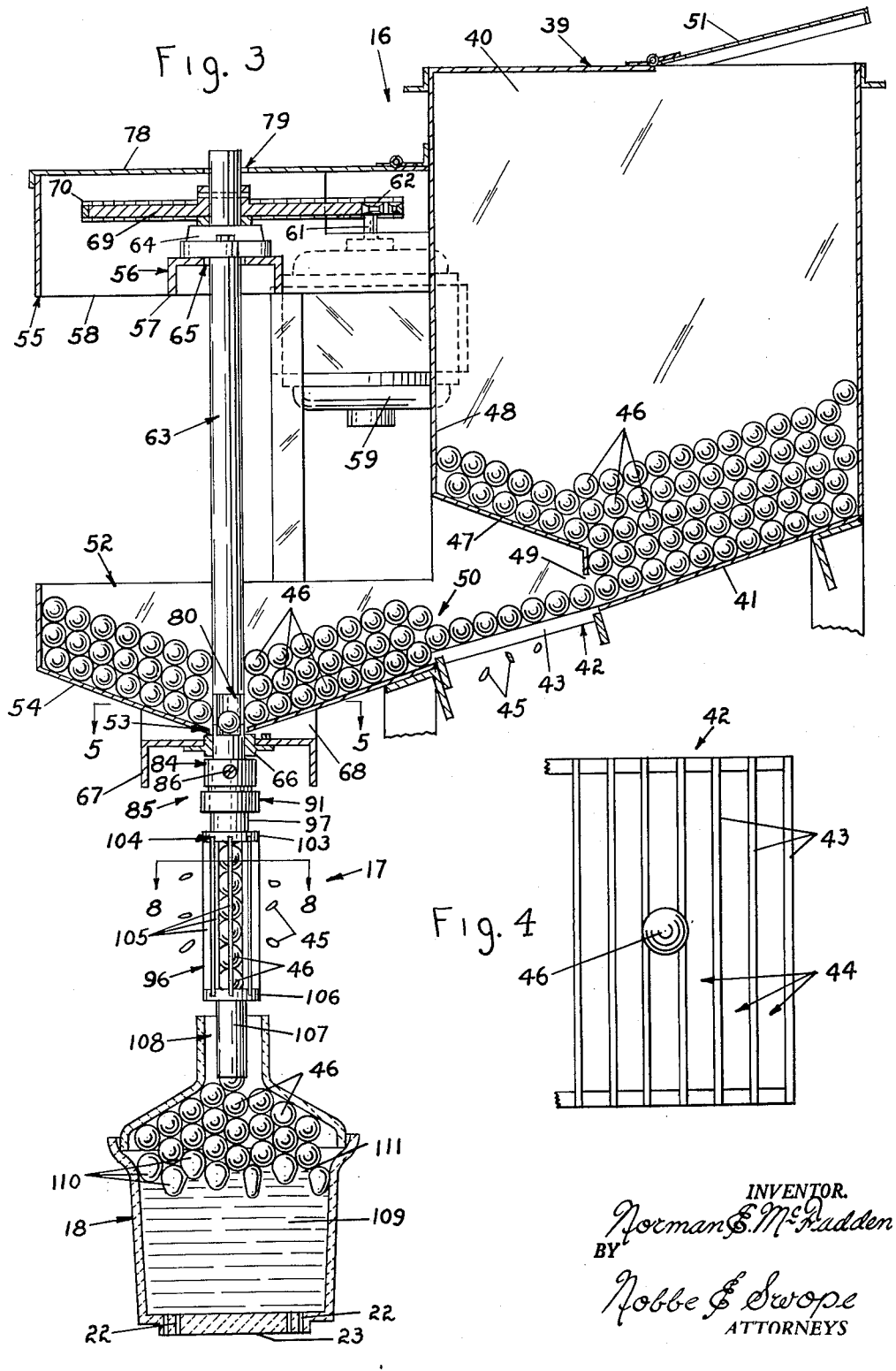
INVENTOR.
Norman E. McFadden
BY
Nobbe & Swope
ATTORNEYS Dec. 19, 1961    N. E. McFADDEN    3,013,361
MARBLE HOPPER AND FEED MECHANISM
Filed Oct. 16, 1957    3 Sheets-Sheet 3

INVENTOR.
Norman E. McFadden
BY
Nobbe & Swope
ATTORNEYS

United States Patent Office 3,013,361
Patented Dec. 19, 1961

3,013,361
MARBLE HOPPER AND FEED MECHANISM
Norman E. McFadden, Defiance, Ohio, assignor, by mesne assignments, to Johns-Manville Fiber Glass Inc., Cleveland, Ohio, a corporation of Delaware
Filed Oct. 16, 1957, Ser. No. 690,534
6 Claims. (Cl. 49—53)

This invention relates broadly to a novel marble hopper or container and feed mechanism suitable for feeding glass marbles into a melting pot. More specificaly it relates to a mechanism for automatically feeding glass marbles into a melting pot in such a manner as to prevent semi-fluid glass marbles from bridging the pot above the fluid level.

In the past it has been the practice in the glass fiber industry to carefully meter the required number of marbles into the melting crucible or bushing, either at regularly timed intervals synchronized to exactly coincide with the volume of molten glass exuding from the bushing, or at periodic intervals determined by a low level sensing device which metered into the crucible a sufficient number of marbles to trigger a high level shut off. Both systems have objectionable features, the first is difficult to synchronize and requires constant watching and adjustment; while the second releases a number of cold marbles into the crucible at once which lowers the temperature of the molten glass in the crucible and adversely affects the drawing of the fibers. In addition, both methods are subject to bridging of the crucible by semi-fluid marbles above the level of the fluid glass.

It is the object of this invention to overcome the difficulties engendered by the timed interval and the low level initiated marble feed mechanisms by gravitationally feeding the marbles into the melting crucible in direct proportion to the volume of glass drawn therefrom.

It is another object of this invention to preheat the marbles prior to their contact with the molten glass in the crucible.

It is still another object of this invention to provide a power driven mechanism to load the feeder tube from a bulky supply of marbles.

It is yet another object of this invention to provide a device for centrifugally ejecting chips of glass and other foreign material from the feeding mechanism prior to entry into the feed tube.

It is a further object of this invention to provide continuously operated rotating means to prevent formation of a bridge of semi-fluid marbles above the fluid glass in the crucible.

Other objects and advantages of the invention will become more apparent during the course of the following description when taken in conjunction with the accompanying drawings.

In the drawings wherein like numerals are employed to designate like parts throughout the same:

FIG. 3 is an enlarged section of the hopper and feed mechanism taken substantially on the line 3—3 of FIG. 2;

FIG. 4 is a detailed drawing of an open-work grill for removing glass chips and foreign matter from the marble supply in the hopper prior to entrance of the marbles into the feeder mechanism;

Figure 1:
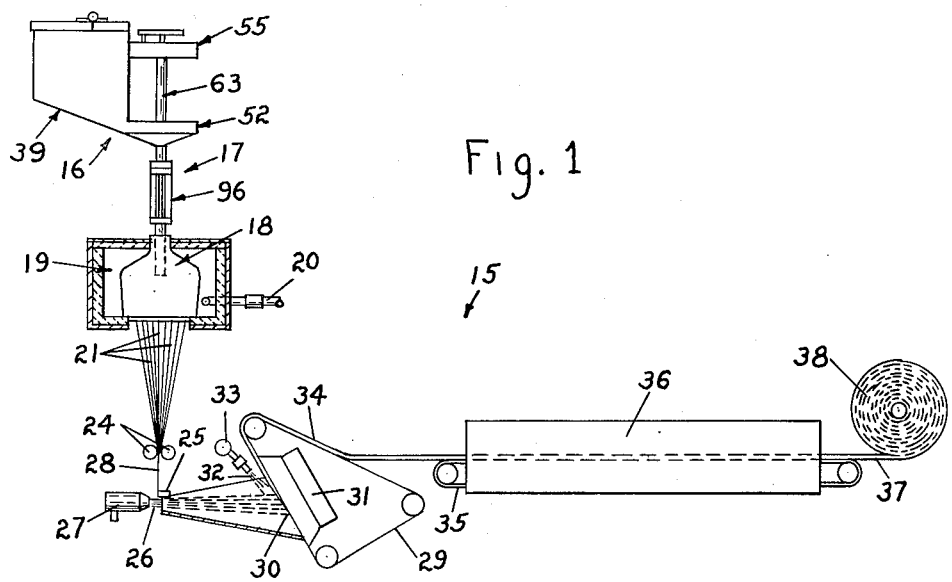
FIG. 1 is a schematic drawing of a machine for making a glass fiber mat, equipped with the novel hopper and feed mechanism.

Referring to FIG. 1 of the drawings, the numeral 15 is used to designate the mat-making apparatus in general, which includes a marble supply hopper 16, a revolving feeder conduit 17 terminating within a glass melting crucible 18 which is enclosed in an insulated chamber 19 and heated by a flame fueled by the pipe 20. The primary fibers 21 exude from holes 22 in the bottom 23 of the crucible 18, are attenuated by a pair of rotating rolls 24, and are gravitationally passed over the face of a guide block 25. A hot gaseous blast 26 emanates from a burner 27, positioned at the bottom edge of the block 25, and impinges upon the secondary fibers 28 for further attenuation and to deposit them upon the face of an endless foraminous belt 29. The area on the belt 29 in which the fibers are deposited is known as the collection area 30 and includes a chamber 31 located behind the belt and in communication with a pump (not shown) which forms a vacuum in the collection area 30 to draw and hold the attenuated fibers onto the belt 29 in a loosely entwined mass.

A binder 32, which may be a resin such as phenol formaldehyde, is deposited in atomized form by a pressurized nozzle 33 on the fibers as they are collected on the belt 29.

The uncured mat 34, formed by the deposition of the fibers on the belt, is transferred to an endless conveyor 35 which carries the mat 34 through an oven 36 to polymerize the resin. Upon emerging from the oven 36 the cured mat 37 is rolled into a package 38.

Figure 2:
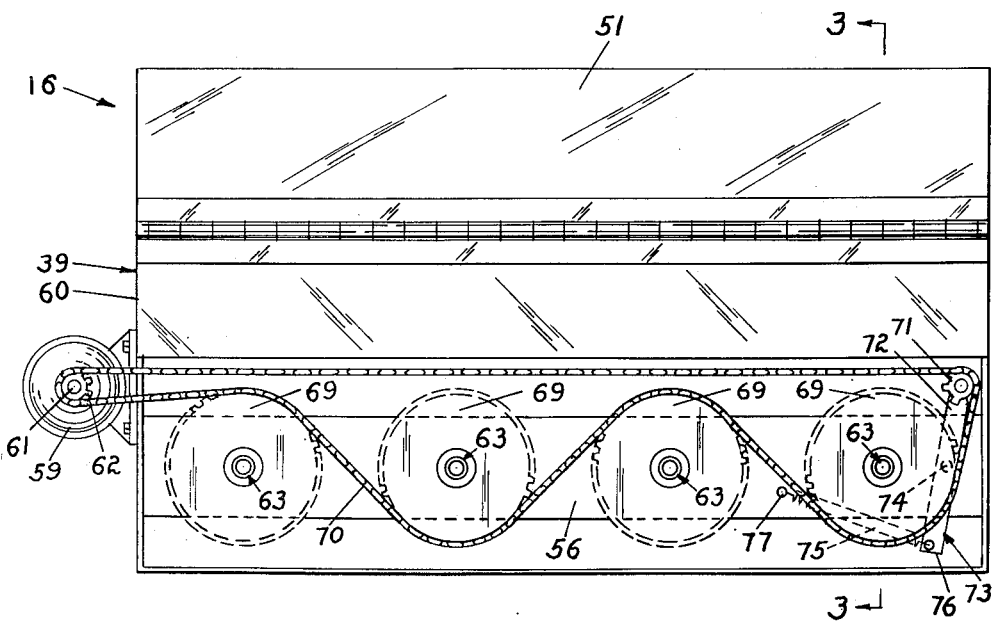
FIG. 2 is a plan view of the hopper showing the motor drive for the feeder mechanism.

Referring now to FIGS. 2 and 3 in particular, the numeral 39 is used to designate a container which may be divided into compartments by walls 40. The bottom or floor 41 of the container 39 slopes downwardly from one side to the other and contains a grill 42 made up of bars 43 extending in the direction in which the marbles gravitate and with spaces 44 between adjacent bars sufficient to permit foreign matter and glass chips 45 to drop through, but which will retain and advance the marbles 46. A baffle 47 extends longitudinally along the side wall 48 of the container 39 above the grill 42. The baffle 47 is directed inward and downward to present a narrow, elongated opening 49 through which the marbles 46 pass in a single layer as they enter upon the grill 42. The baffle 47 relieves pressure upon the marbles 46 on the grill 42 to prevent jamming of the marbles 46 at the exit point 50 for the marbles 46 from the container 39 and permits gravitational separation of foreign matter. A lid 51 is hingedly connected to the top of the container 39 to permit replenishing the supply of marbles 46 in the container 39.

The bottom 41 of the marble supply container 39, at the low or exit end 50 thereof, which is also the low end of the grill 42, is joined to a series of hopper-bottomed, open top receptacles 52, one for each container and each having a circular hole 53 formed in the bottom 54 at the convergence point. A three-sided framework 55 projects outwardly from the wall 48 of the hopper 39 directly above in spaced relation to the receptacles 52 and supports a channel 56 with its longitudinal centerline in vertical alignment with the centerline which passes through the holes 53 in the bottom of the receptacles 52. The legs 57 of the channel project downwardly to a point flush with the bottom edge 58 of the framework 55.

A motor 59 is fastened to one end 60 of the hopper 39 with its shaft 61 projecting upward and spaced outwardly from the wall 48 of the hopper 39. A sprocket 62 is secured to rotate with the motor shaft 61.

The number of marble feeders 17 corresponds to the number of crucibles 18 and for purposes of illustration four are shown, but this is in no respect to be considered a limitation. Since the marble feeders 17 are identical in all details, the following description of one will suffice for all.

A hollow pick-up tube 63, having an inside diameter slightly larger than the diameter of the marbles 46, extends through a bearing 64 mounted on the top of the channel 56, clearance holes 65 and 53 in the channel 56 and the hopper-bottomed receptacle 52, respectively, and through a bottom bearing 66 secured to a second channel 67 which extends longitudinally beneath the receptacles 52 and is attached to the end receptacles by a pair of risers 68. A sprocket 69 is secured to the top of each pick-up tube 63 and a chain 70 is enmeshed with the sprocket 62 on the motor 59 and each of the pick-up tube sprockets 69 and with an idler sprocket 71 rotatably supported on one end 72 of a bar 73 which is secured at its mid-point by a pivot 74 to the top channel 56. A spring 75 is attached to the other end 76 of the bar 73 and is anchored on a pin 77 projecting upward from the top channel 56. This arrangement is shown in detail in FIGS. 2 and 3 and serves to continuously rotate the pick-up tubes 63 at a uniform speed and to properly tension the chain 70. A protective cover 78 is attached by a hinge to the top side of the bracket and is provided with clearance holes 79 through which the tops of the pick-up tubes 63 project.

Figure 5:
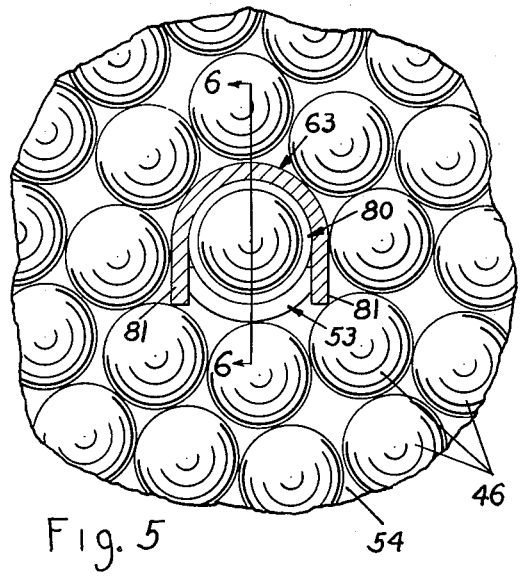
FIG. 5 is a cross-sectional view taken on the line 5—5 of FIG. 3, showing the marble pick-up tube.
Figure 7:
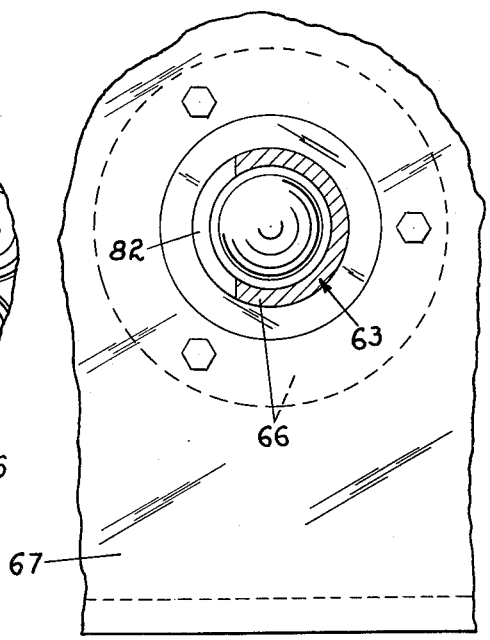
FIG. 7 is another cross-sectional view of the pick-up tube taken on the line 7—7 of FIG. 6, below the level of the hopper.
Figure 6:
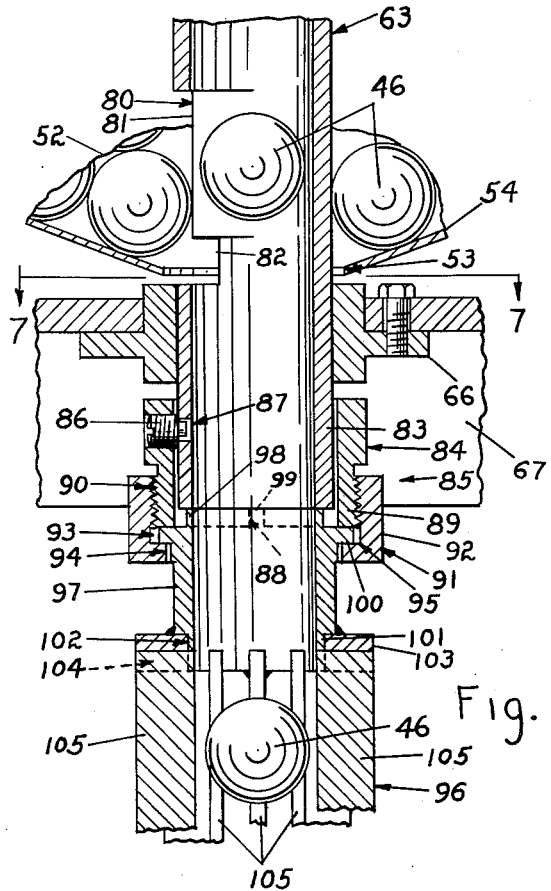
FIG. 6 is a vertical section of the pick-up tube taken on the line 6—6 of FIG. 5.
Figure 8:
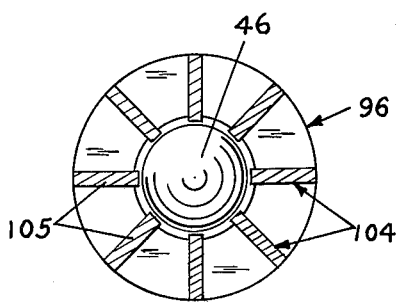
FIG. 8 is a cross-sectional view of the rotary chip ejector taken on the line 8—8 of FIG. 3.

At an elevation of approximately one and one-half marble diameters above the bottom 54 of the receptacle 52, the pick-up tube 63 is split and opened as indicated by the numeral 80 in FIGS. 5 and 6 so that in cross-section the tube is U shaped. The legs 81 of the U-shaped section are shortened, as shown in FIGS. 5 and 6, by removing a section of the metal. Directly below the U-shaped opening 80 and spanning the hole 53 in the bottom 54 of the receptacle 52 additional sections are removed from one side of the tube, as shown by the numeral 82 in FIGS. 6 and 7, to prevent jamming a marble between the wall of the hole 53 and the tube 63.

The lower end 83 of the pick-up tube 63 is encompassed by and is connected to the male half 84 of a coupling 85 by dog point set screws 86 entering holes 87 formed in the wall of the tube 63. A pair of diametrically opposed slots 88 extend upwardly from the bottom of the male coupling 84. The lower portion 89 of the male coupling 84 is threaded and is received by threads 90 in the female half 91 of the coupling 85. The portion 92 of the female half 91 of the coupling 85 below the threads is provided with an undercut 93 and a bore 94, both concentric with threads 90 and the outside diameter, cooperating to form a shouldered recess 95 for reception of the combination feed sight and chip remover 96.

The upper or inlet portion 97 of the feed sight 96 is tubular with the inside diameter the same as that of the pick-up tube 63 and has a thin annular wall 98 with a pair of diametrically opposed lugs 99 extending outwardly and adapted to engage the slots 88 in the lower face of the male half 84 of the coupling 85. The annular wall 98 terminates in a circular flange 100 which is received by the undercut 93 in the female half 91 of the coupling 85 so that the upper face of the flange 100 bears against the lower face of the male half 84 of the coupling and the bottom face of the flange 100 bears against the upper face of the shoulder 95 within the female half 91 of the coupling 85, thereby maintaining alignment of the bores in the tube 63 and the feed sight 96.

The lower end of the inlet 97 to the feed sight 96 is provided with a reduced diameter annular pilot 101 which enters a hole 102 formed centrally in a circular flange 103 and is secured by welding. The lower face of the flange is notched radially at eight equally spaced intervals 104, bars 105 are positioned in the notches 104 with their inner and outer edges respectively flush with the inside diameter of the inlet 97 and the outside of the flange 103. The bars 105 depend to a bottom flange 106, which is identical with the top flange 103, but is inverted. An outlet tube 107, also of the same inside diameter as the pick-up tube 63 and the feed sight 96, extends downward from the bottom flange 106 into the inlet 108 of the crucible 18. It will be noted that the passageway or conduit extending through the pick-up tube 63, the sight feed 96 and the outlet tube 107 is of continuously uniform diameter and that these elements are coupled to rotate in unison. Any foreign matter or glass chips 45 descending with the marbles 46 into the revolving sight feed 96 will be discharged through the openings between the bars 105 by centrifugal force.

The apparatus described in detail above is readied for operation by filling the container 39 with marbles 46, which gravitate over the grill 42 to rid the supply entering the individual receptacles 52 of glass chips and foreign matter 45. Each crucible 18 is charged initially by inserting the required number of marbles 46 through the top of its associated pick-up tube 63 and is fired in the usual manner to elevate the temperature of the glass marbles 46 in the crucible 18 to reduce the marbles 46 to a fluid state 109 of the required viscosity. When the glass begins to flow through the holes or nipples 22 in the bottom 23 of the crucible 18, thereby forming primary fibers 21, the motor 59 associated with the marble feed apparatus 17 is placed in operation to rotate each of the pick-up tubes 63, the sight feed 96 including the tube 107 which enters the inlet 108 of the crucible, and, in the event the tubes 63 are not filled to the level of the openings 80 therein, marbles 46 will be picked up singly until that level is reached. As previously disclosed, any foreign matter or glass chips entrained with the marbles in the pick-up tube 63 will be discharged upon descent to the sight feed 96.

Prior to the initiation of the drawing of the primary fibers 21, the motors (not shown) driving the attenuating rolls 24, the collection and oven conveyors 29 and 35 respectively, the binder applicator pump (not shown) and the vacuum pump (not shown) are energized and the burners 27 associated with the hot gaseous blast 26 and the oven 36 are lit.

As the molten glass 109 is withdrawn from the crucible 18 the lowermost marble 46 in the sight feed outlet tube 107 drops into the crucible 18 and all the other marbles 46 in the passageways move down vacating the U shaped, open section 80 of the tube 63. As the pick-up tube 63 revolves, the legs 81 forming part of the U agitate the surrounding marbles 46 so they move freely toward the tube 63 and one marble 46 is picked up from the receptacle 52 and fills the void in the passageway at the level of the open section 80 of the pick-up tube 63. The pick-up is automatically repeated as the open section 80 of the pick-up tube 63 becomes unoccupied by a marble 46, so that a constant level of molten glass is maintained in the crucible 18. Furthermore, a uniform supply of preheated and semi-fluid marbles 110 float upon or slightly below the surface 111 of the molten glass 109, which overcomes temperature fluctuations within the melting pot 18 incident with any form of intermittent feeding of the marbles 46. The uniform temperature maintained in the crucible 18 results in an increased flow of primary fibers 21 through the holes or nipples 22 and greatly reduces variations in diameter throughout the length of the fibers.

As previously pointed out, when the marbles 46 are fed into the crucible by merely dropping them from a feed tube, there is a tendency for a semi-fluid mass of glass bridging across the walls of the pot and to remain suspended as the molten glass 109 therebeneath sinks lower in the pot and finally upon its exhaustion, the drawing of fibers ceases until the crucible is opened and the bridge broken up. These interruptions are time consuming and costly. With the structure disclosed above, wherein the tube 107 feeding marbles 46 to the crucible 18 is in constant contact with the mass of marbles 110 floating on the surface 111 of the molten glass 109 and the tube 107 is constantly rotated, the mass of marbles and the molten glass within the crucible 18 are also rotated and the semi-fluid marbles 110 are prevented from adhering to the wall of the melting pot. The tube 107 forming the lower end of the conduit 17 and the contacting preheated and semi-fluid marbles form a friction clutch. The mass of marbles 46 floats upon the surface 111 of the molten glass 109 and the lower portion of the mass is gradually reduced to a molten state at a rate commensurate to the volume of glass withdrawn from the crucible 18 in the form of primary fibers 21.

For purposes of illustration, the apparatus forming the subject matter of this invention is shown in conjunction with mat-making machinery. However, it is a simple matter to utilize the marble hopper and feed mechanism shown in the formation of a continuous strand by omission of the attenuating rolls and all subsequent operation apparatus and the substitution of apparatus for collecting and bonding the primary fibers into a single strand and winding them into a cake.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:
1. Marble feeding apparatus adapted to feed glass marbles to a melting crucible provided with a plurality of apertures in its base for exuding molten glass, which comprises: a supply of glass marbles; means forming a marble supply hopper having a sloping bottom, said bottom being provided with a grilled portion over which the marbles travel, said grilled portion forming a cullender for fragmentary particles; a rotatable feed tube having an upper end portion extending through said bottom a distance sufficient to define an ingress opening whereby marbles are admitted into said tube, one at a time, as it is rotated, said upper end portion being provided with a projection extending from said upper end portion and within said hopper, said projection being adapted to agitate the marbles in said hopper as said tube is rotated, said tube also having a lower end portion extending into said crucible through which said marbles are passed, said lower end portion in combination with the marbles in said crucible forming a friction clutch to stir the glass within said crucible and prevent bridging thereof; said tube also being provided with a plurality of openings positioned intermediate of its end portions, said openings forming a centrifugal cullender for fragmentary particles; and means for rotating said tube.

2. Marble feeding apparatus adapted to feed glass marbles to a melting crucible provided with a plurality of apertures in its base for exuding molten glass, which comprises: a supply of glass marbles; a rotatable feed tube having an upper end portion defining an ingress opening whereby marbles are admitted into said tube for passage to said crucible, said tube also having a lower end portion extending into said crucible, said lower end portion in combination with the marbles in said crucible forming a friction clutch to stir the glass within said crucible and prevent bridging thereof; and means for rotating said tube.

3. The apparatus as defined in claim 2, wherein said tube is provided with a plurality of openings positioned intermediate of its end portions, said openings forming a centrifugal cullender for fragmentary particles.

4. Marble feeding apparatus adapted to feed glass marbles to a melting crucible provided with a plurality of apertures in its base for exuding molten glass, which comprises: means forming a supply of glass marbles; means forming a marble supply hopper having a sloping bottom; a rotatable feed tube having an upper end portion extending through said bottom a distance sufficient to define an ingress opening whereby marbles are admitted into said tube, one at a time, as it is rotated, said tube also having a lower end portion extending into said crucible, said lower end portion in combination with the marbles in said crucible forming a friction clutch to stir the glass within said crucible and prevent bridging thereof; and means for rotating said tube.

5. The apparatus as defined in claim 4, which comprises a projection extending from said upper end portion and within said hopper, said projection being adapted to agitate the marbles in said hopper as said tube is rotated.

6. In the process of forming glass fibers, the steps comprising: providing a source of glass marbles; arranging a number of said marbles in a gravity free falling column above a glass melting crucible provided with a plurality of apertures through which molten glass is exuded; and continuously rotating said column while maintaining contact with the semi-molten glass within said crucible to stir the glass therein and prevent bridging of the semi-molten glass.

References Cited in the file of this patent
UNITED STATES PATENTS

| | | |
|---|---|---|
| 2,308,188 | Madden | Jan. 12, 1943 |
| 2,482,071 | Simison | Sept. 13, 1949 |
| 2,500,698 | Mills | Mar. 14, 1950 |
| 2,687,599 | Fletcher | Aug. 31, 1954 |
| 2,780,890 | Russell | Feb. 12, 1957 |
| 2,786,566 | Taggart et al. | Mar. 26, 1957 |
| 2,875,893 | Russell et al. | Mar. 3, 1959 |

FOREIGN PATENTS

| | | |
|---|---|---|
| 483,080 | Canada | May 6, 1952 |
| 1,008,738 | France | Feb. 27, 1952 |